United States Patent

[11] 3,599,510

[72] Inventors John W. Scott, Sr.
  Canoga Park, Calif.;
  John A. Hockenson, Seattle, Wash.
[21] Appl. No. 866,791
[22] Filed Oct. 6, 1969
[45] Patented Aug. 17, 1971
[73] Assignee The Boeing Company
  Seattle, Wash.

[54] CONTROLLED DEVICE COMPRISING ALTERNATE MANUAL OR POWER OPERATORS
5 Claims, 6 Drawing Figs.

[52] U.S. Cl............................................................ 74/625,
  192/79, 244/83 R
[51] Int. Cl............................................................ B64c 13/04,
  F16d 13/10
[50] Field of Search........................................... 74/480 R,
  625; 192/79; 244/83 R

[56] References Cited
UNITED STATES PATENTS

| | | | |
|---|---|---|---|
| 2,394,384 | 2/1946 | Horstmann.................. | 74/625 |
| 2,420,214 | 5/1947 | Whempner.................. | 74/625 X |
| 3,312,121 | 4/1967 | Lewis.......................... | 74/480 |
| 3,360,088 | 12/1967 | Farr et al..................... | 74/480 X |
| 3,363,480 | 1/1968 | Murphy........................ | 74/625 X |

Primary Examiner—Allan D. Herrmann
Attorneys—Glenn Orlob, Kenneth W. Thomas and Bernard A. Donahue ABSTRACT: A control system utilizing a compact clutch assembly which will allow an output member to be driven by either of two input members, and the output member to back drive one of said input members. The preferred embodiment involves an aircraft engine throttle control system which has a clutch assembly located adjacent to the manual operating levers in the pilot's control console. The clutch utilizes friction shoes which are pivotally mounted on the output member and normally spring biased into frictional contact with an autopilot servo-controlled disk. For manual operation, cam means are employed to lift the frictional contact with the servodisk for direct drive of the output members by a manual throttle lever. The clutch will allow manual override through slipping of the shoes in the event the cam means fails to function, and will similarly allow a back drive of the output member and the manual lever by feedback forces from a thrust reverser actuated mechanism.

PATENTED AUG 17 1971

INVENTORS:
JOHN W. SCOTT SR.
JOHN A. HOCKENSON
BY
Bernard A. Donahue
ATTORNEY

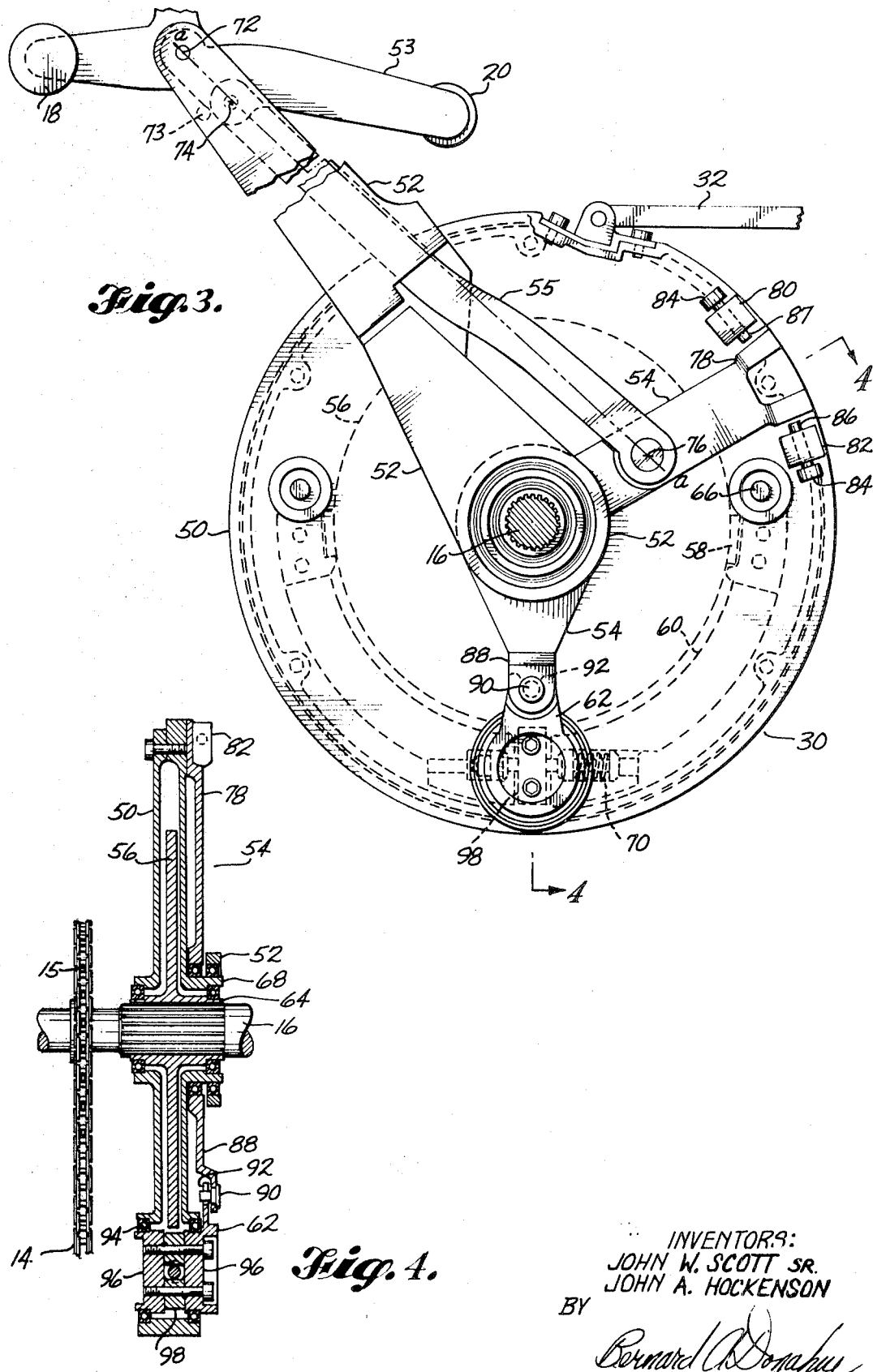

INVENTORS:
JOHN W. SCOTT SR.
JOHN A. HOCKENSON
BY
Bernard A. Donahue
ATTORNEY

CONTROLLED DEVICE COMPRISING ALTERNATE MANUAL OR POWER OPERATORS

This invention relates to control systems in which an output member is selectively driven by either of two input members and, more particularly, to a system in which a friction clutch assembly normally causes the output member to be driven by a servo-controlled disk for automatic operation, with provision for manual override through a manual input lever, and provision for back drive of the manual input lever by feedback forces passing through the output member during automatic operation.

In modern multijet engine aircraft, throttle control of each engine is achieved by rotation of a control cable quadrant. The quadrant position is adjusted either by an automatic pilot controlled servo disk, or by a pilot-operated lever system.

In certain throttle control systems, it has been found desirable for safety reasons to provide means for immediately reducing engine throttle level in the event the engine thrust reverser should be inadvertently deployed during forward thrust operation or inadvertently retracted during the reverse thrust mode. Such means are preferably located at the engine and actuated by the thrust reverser mechanism to impart a backdrive torque into the control cable to reduce the throttle level to the idle range. Such a reverse drive will backdrive the control cable quadrant located near the pilot's console, the output member of the clutch assembly connected thereto, and should, of course, also backdrive the pilot's manual control lever accordingly.

Many current auto throttle clutch systems, exemplified by U.S. Pat. Nos. 3,335,831 and 3,335,832 to Kalns and Candella, respectively, are essentially either no-back devices which instantly ground out feedback torques, or irreversible mechanisms which tend to block a reverse drive from the driven to the driver member. Separate slip clutch elements, acting between the clutch pack and servo input drive rings, such as shown in FIG. 7 of Kalns and FIG. 2 of Candella, are required if these systems are to allow a backdrive of the manual input member from the output member, or are to allow a manual override in the event the clutch malfunctions and remains jammed to the servo driver. It is obvious that the elimination of these separate slip clutch elements would be desirable from the standpoint of simplicity, economy, and compactness of design. Also, as is discussed in these two patents, each requires either a special neutralizer unit or a control means to assure a proper and critical spaced relationship of force transmitting elements with respect to actuating elements upon a return to servo drive from the manual mode of operation.

It is an object of this invention to provide a compact clutch system for drivingly engaging an output member with a servo-controlled disk in an automatic mode of operation, while permitting a backdrive of the output member from the mechanism controlled by the output member, without a requirement for extraneous slip clutch elements.

It is a related object of this invention to provide a compact clutch with means for manual override of the servosystem at any time, even in the event of a malfunction of the means normally used to disconnect the servo drive train, without a requirement for slip clutch elements in series with the basic clutch pack elements.

A further and related object of this invention is to provide an improved compact clutch assembly in which the number of operating elements is minimized; which is capable of reliable functioning in the servo mode without a requirement for a critically controlled spaced clearance between the force transmitting elements and the manual override actuating elements; and wherein the manual override is normally accomplished without frictional drag between clutch components.

A further related objective of this invention is to provide an autothrottle clutch system for throttle control of an aircraft jet engine in which the manual operation frictional loads are minimized, and breakout forces during pretravel for manual operation are considerably less than the forces required for normal manual operation.

A related objective is to provide a clutch assembly which can be packaged so compactly that the clutch may be installed directly in the pilot's control stand in a multiengine installation; this in contrast to prior clutch installations which usually are located remotely from the manual controls.

A further objective of this invention is to provide an improved and simplified aircraft engine autothrottle control system which provides means for autopilot control of throttle level, means for disengaging autopilot control, means for manual override of the servosystem in the forward thrust mode, means for manual control of engine thrust reverser deployment and throttle level during the reverse thrust mode, and means for backdriving the manual control in the event of inadvertent reverser deployment or retraction, wherein manual override is always possible even in the event the means for disengaging autopilot control should fail to function properly.

The above objectives are achieved in this invention through the utilization of the above-named means in combination with a compact clutch assembly adapted to frictionally grasp an autopilot-driven servo input disk by means of shoe elements forced into frictional driving contact with a servo disk for automatic operation, and a manually operated lever system which may be actuated to displace the friction shoe element to eliminate the frictional driving contact and to engage an output member for direct manual control.

BRIEF DESCRIPTION OF THE DRAWINGS

FIG. 3 shows an individual engine control installation comprising forward and reverse thrust manual control levers and the clutch pack assembly which selectively engages an autopilot controlled servo disk.

FIG. 4 is a broken cross section taken along lines 4—4 in FIG. 3.

DESCRIPTION OF THE PREFERRED EMBODIMENT

Figure 1:
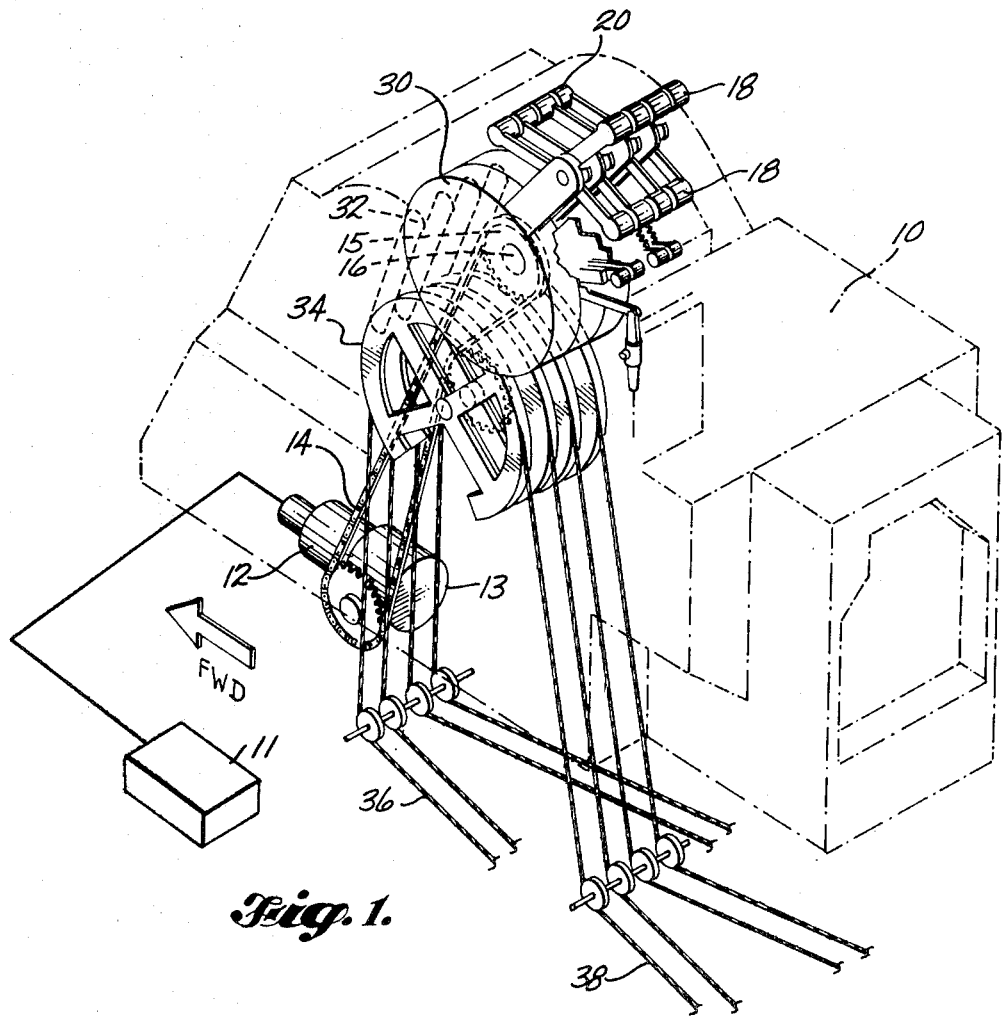
FIG. 1 shows an aircraft pilot's console installation for manual and automatic control of the throttle level of each of four engines.

Referring now to FIG. 1, a pilot's control console is depicted by dotted lines at 10. An autopilot 11 is schematically shown to be operably connected to a servomotor 12 which is drivingly engaged with gear box 13 chain drive 14, sprocket 15 and splined shaft 16. The pilot's manual forward thrust handles are shown at 18, with an independently operable reverse thrust handle at 20. A clutch assembly of the type to be disclosed in detail in subsequent figures is schematically depicted at 30, with output linkages 32 interconnecting to cable control quadrants 34. The control cables 36, 38 are suitably attached to the quadrants 34, and are arranged for deployment to similar control quadrants remotely located at each engine installation.

In operation, the quadrants 34 are optionally controlled and positioned either by the servomotor 12 or the manual levers 18, 20 through the clutch assembly 30. The automatic throttle system is activated by an autothrottle engage switch on the pilot's load select panel (not shown). A control knob on the panel is set to the desired air speed, and an error signal proportional to the difference between indicated and desired air speed is received by an autopilot computer which sends the proper signal to the servomotor 12.

The servo system is designed to maintain the airspeed set by the pilot during approach and to execute the landing flare. The servomotor 12 operates through a gear box 13, chain drive 14, sprocket 15 and splined shaft 16, to position servo input disks within each of the respective clutch assemblies. With the clutch 30 engaged in the servo mode, movement of the shaft 16 is transferred to the output quadrant 34. The gear box system 13 is preferably of very low efficiency and essentially irreversible to preclude inadvertent backdrive of the servo system.

Figure 2:
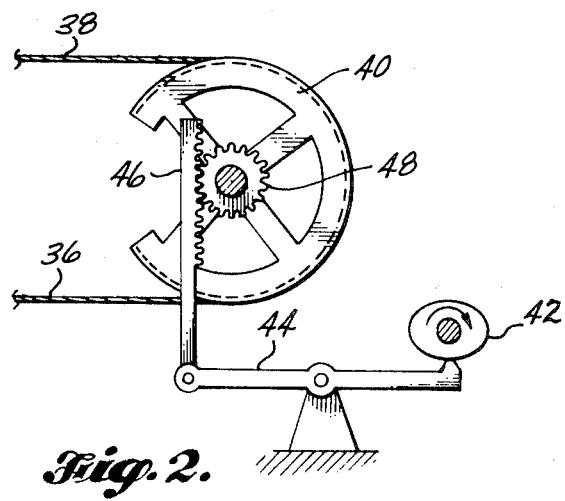
FIG. 2 schematically depicts a control quadrant and backdrive mechanism located at one of the engines controlled by the console of FIG. 1.

FIG. 2 schematically depicts a control quadrant 40 of the type located at each engine and operatively coupled with the pilot's console of FIG. 1, through the control cables 36 and 38. The control quadrant 40 drives the engine throttle mechanism (not shown). The system is equipped with means 42, 44, 46, 48 for backdriving the quadrant to the throttle idle range in the event of inadvertent deployment or retraction of the thrust reverser system. A cam 42 is rotatably mounted and torsionally interconnected with the thrust reverser actuating mechanism (not shown). Upon deployment or retraction of the reverser system, the cam 42 will be rotated. If the bar 44 is in a position corresponding to an advanced throttle setting (as shown in FIG. 2), the cam 42 will engage the bar 44 and pivotally displace it in a clockwise direction. Such a pivoting of the bar 44 will cause the rack 46 to be displaced upwardly with accompanying rotation of pinion 48 which will backdrive the quadrant 40, cables 36 and 38, quadrant 34, linkage 32, and the manual control levers 18 and 20, into their respective positions for throttle idle operation.

FIGS. 3 and 4 provide a detailed disclosure of one of the engine throttle control installations shown in the console of FIG. 1. Numerical designations for the splined shaft 16, forward thrust handles 18, reverse thrust handles 20, clutch assembly 30, and output linkage 32 correspond with those of FIG. 1. The control installation includes a generally designated clutch assembly 30, a clutch housing 50 which acts as an output member, a forward thrust lever 52, a reverse thrust lever 53, an actuating lever 54, an interconnecting link 55, a servo disk 56, clutch shoes 58, shoe supports 60, and a clutch release sector 62. The servo disk 56 is rigidly affixed to splined shaft 16. The housing 50 is rotatably mounted on flanges 64 of the servo disk 56 and essentially encloses disk 56, clutch shoes 58, and supports 60.

The shoe supports 60 are pivotally mounted upon pins 66 which are received in the exterior walls of housing 50. In a manner which will be more fully disclosed in connection with FIGS. 5 and 6, a compression spring 70 serves to urge the two free ends of supports 60 toward each other, and therefore to urge the clutch shoes 58 into bearing engagement with the outer periphery of servo disk during the servo drive mode. It is apparent that during servo drive, the housing 50 will tend to rotate concurrently with the servo disk 56 due to frictional load transfer across shoes 58. Rotation of housing 50 will of course displace output linkage 32 and change the position of the output quadrant 34 of FIG. 1 accordingly.

The forward thrust lever 52 and actuating lever 54 are each independently rotatably mounted on an exterior flange 68 of the housing 50. The reverse thrust lever 53 is pivotally mounted at 72 on forward thrust lever 52. The interconnecting link 55 is pivotally attached to the levers 53 and 54 at points 74 and 76, respectively. Interconnecting link 55 is designed to provide an interlock between the levers 52 and 54 during forward thrust operation, and to provide a driving connection between levers 53 and 54 during the reverse thrust mode.

In FIG. 3 the reverse thrust lever 53 is in its stowed position for forward thrust operation, at rest against a stop 73 within the lever 52 to prevent further clockwise rotation. In this position the interconnect linkage 55 serves to provide an overcenter interlock between forward thrust lever 52 and actuating lever 54, so that levers 52 and 54 move concurrently at all times. It can be seen that the point 74 is located slightly to the left of a centerline $a-a$ drawn between points 72 and 76.

Therefore, if pilot force is applied to handle 18 of lever 52 to increase thrust (clockwise as shown), the interconnect linkage 55 will be loaded in compression, thereby causing a small reaction force on stop 73, and requiring concurrent movement of lever 54 with the lever 52. If the pilot applies force to handles 18 to reduce the forward thrust level setting (counterclockwise as shown), the interconnect linkage 55 will be loaded in tension (causing the point 74 to move slightly to the right to a position along the centerline $a-a$) and will require the actuating lever 54 to move concurrently with forward thrust lever 52. Therefore, at all times during forward thrusting operation the actuating lever 54 is forced to move concurrently with forward thrust lever 52.

The actuating lever 54 includes a driving portion 78 located between fixed abutment members 80 and 82 which are rigidly affixed to the housing 50. Threaded setscrews 84 allow adjustment of abutment faces 86 and 87. The actuating lever 54 includes a lower portion 88 having attached thereto a pin 90 which is nested within an upper cradle portion 92 of the clutch release sector 62. The sector 62 is rotatably mounted within the housing 50 by ball bearings 94, and comprises outer circular portions 96 and an inner portion 98 which is arranged in juxtaposition to the end faces of shoe supports 60.

Figure 5:
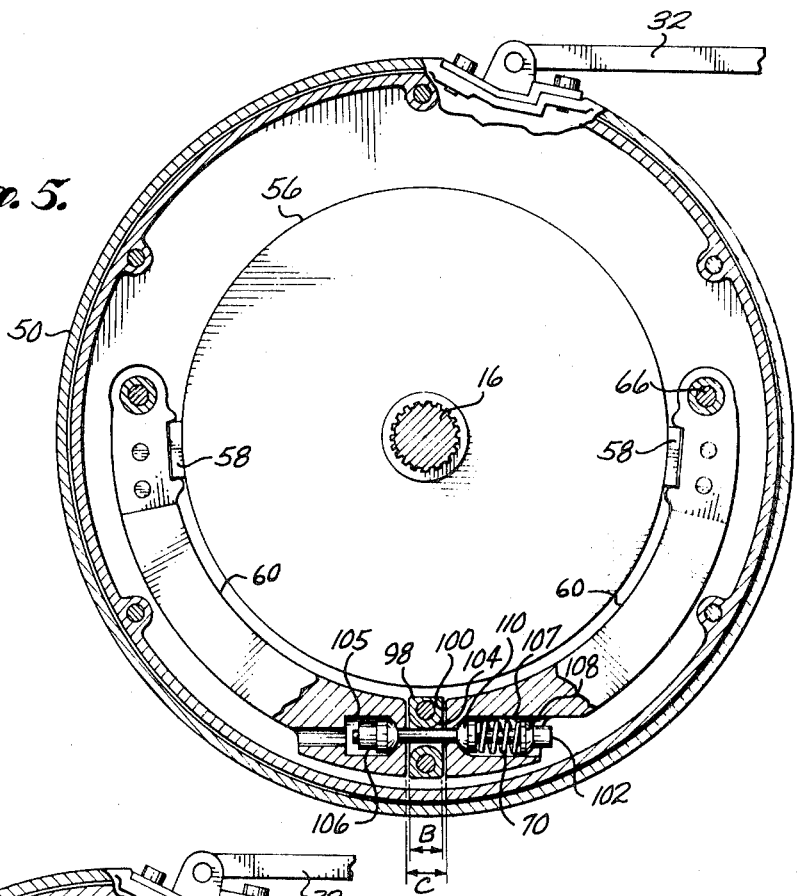
FIG. 5 is an interior showing of the components of the clutch pack assembly positioned for the servo drive mode of operation.

Referring now to FIG. 5, the internal clutch components are shown positioned for the servo driver mode. The center portion 98 of the clutch sector 62 is centrally located between opposing end faces 100 of the supports 60. A bolt member 102 passes through a shaped central opening in inner portion 98. The bolt member 102 is equipped with a fixed seat portion 106, a fixed end portion 108 and a floating seat member 110 which is urged to the left by compression spring 70 acting against fixed end portion 108. It can be seen that the compression spring 70 will urge the opposing end faces 100 closer together to thereby bring clutch shoes 58 into contact with the servo disk 56.

The clutch shoes 58 are preferably constructed of a material having a static coefficient of friction of from 0.4 to 0.6 and an extremely long wear lifetime. Such materials are found among the composites described in copending U.S. Pat. application Ser. No. 675,328, entitled "High Strength Self Lubricating Materials" which is assigned to the assignee of this application. In working embodiments built in accordance with the teachings of this disclosure, the distance C between end faces 100 and the width B of the center portion 98 have been configured such that C exceeds B by less than 0.015 inch when clutch shoes 58 are effectively engaged against servo disk 56 for the automatic mode of operation. While the center portion 98 is shown to be in parallel alignment with end faces 100 in FIG. 5, there is no requirement for precise alignment of these members, and, as a practical matter, the center portion 98 may be tilted slightly and actually rest against and contact the faces 100 without detriment to the system. The spring 70 is sized to provide resistance to inertia or vibration loadings imparted to the system and to maintain the normal forces acting on the clutch shoes 58 within a desired range, considering the friction coefficients of the shoe material and the desired torsional load transfer requirements between servo disk 56 and output member 50. From the preceding discussion and description it will be apparent that the load transfer requirements for the system include the following: (1) transfer of normal servo loads from disk 56 to output member 50 without slipping, (2) slipping of the shoes under backdrive loads imparted by the thrust reverser actuated means disclosed in FIG. 2, and (3) slipping of the shoes 58 under emergency manual override loads in the event the clutch release means should fail to function.

Figure 6:
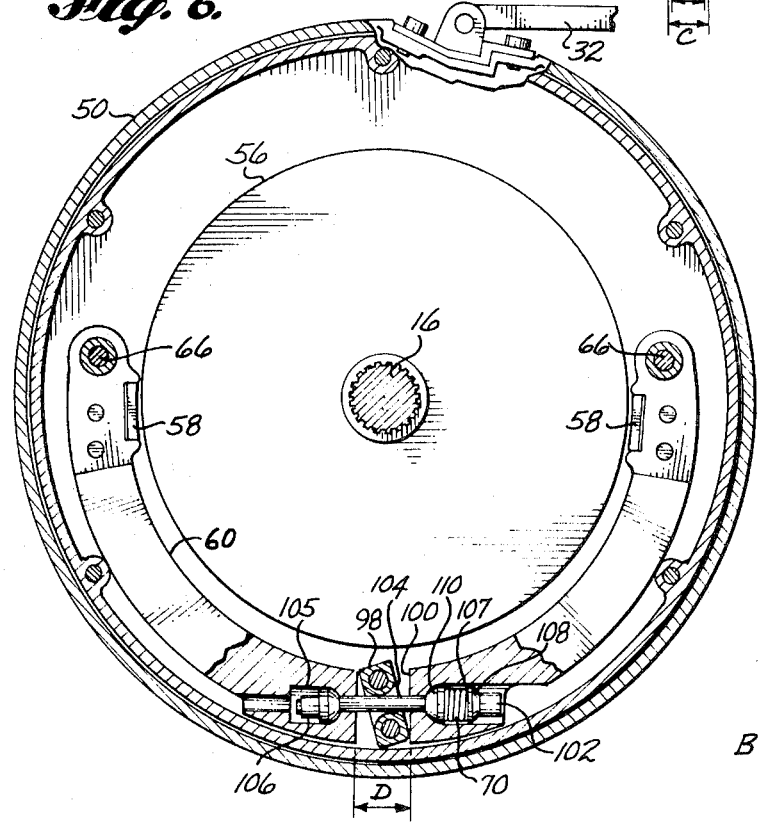
FIG. 6 is an interior showing of the clutch pack components positioned for manual operation.

FIG. 6 illustrates the operation of the clutch release means for disengaging the driving connection between output member 50 and servo disk 56. The distance D between end faces 100 has been greatly exaggerated for purposes of illustration. In actual working embodiments the distance D can be designed to exceed distance C (FIG. 5) by less than 0.040 inch. In other words, the clutch shoes 58 will be satisfactorily disengaged by movement of center portion 98 such that each end face is displaced by less than 0.020 inch.

It will be apparent that movement of center portion 98 to disengage the clutch is achieved by rotation of clutch release sector 62 through movement of the manually operated means 52, 55, 54, 88, 90 and 92 illustrated in FIGS. 3 and 4. Accordingly, when the pilot applies force to handles 18 to increase the forward thrust setting (clockwise as shown in FIG. 3), initial movement of levers 52 and 54 is effective to apply a counterclockwise force to cradle 92 of clutch sector 62 through the pin 90, thereby tending to rotate center portion 98 to spread end faces 100, into the clutch disengaged positions shown in FIG. 6.

It will readily be understood that the setscrews 84 (FIG. 3) are adjusted to provide a direct drive between the driving portion 78 of actuating lever 54 and the abutment faces 86 and 87 after an initial movement, or pretravel, sufficient to disengage the clutch. When the clutch shoes 58 are free of the servo disk 56, and the lever 54 is directly driving the output members 50 and 32, there are no clutch elements in frictional contact. The pilot force over and above the small amount necessary to partially compress spring 70 is not diminished by frictional or dragging forces within the clutch as has been the case in many prior art "jamming"-type systems.

As has been discussed previously, the reverse thrust lever 53 will remain in its stowed position, shown in FIG. 3, at all times during forward thrust operation. When the pilot desires to initiate reverse thrust operation, the forward thrust lever 52 is moved to its idle position against stops on the console (not shown). The reverse thrust handle 20 is then grasped by the pilot to initiate independent counterclockwise movement of lever 53. This causes thrust reverser actuation through a switching system (not shown). Continued rotation of lever 53 about pivot point 72 will establish corresponding movement of interconnecting linkage 55 and actuating lever 54, thereby causing driving portion 78 to engage a setscrew 84 to move output members 50 and 32 into the reverse thrust throttle control positions. Rotation of lever 54 will of course cause the lower portion 88 to actuate the clutch release means in the manner previously discussed in connection with forward-thrusting operation.

We claim:

1. In a control system which includes a device to be controlled, automatic means for controlling said device, manually operable means for controlling said device, a clutch mechanism for disconnecting the device from said automatic means and connecting it to the manually operable means for control thereby; said clutch mechanism comprising:

an input member connected to said automatic control means;

an output member operably connected to said device;

a clutch shoe pivotally carried by one of said input and output members and disposed in juxtaposition to the other of said input and output members;

biasing means normally urging said clutch shoe into frictional engagement with said other of said input and output elements to clutch said elements together for concurrent movement wherein said biasing means exerts a normal force on said clutch shoe which is directly proportional to the biasing force developed by said biasing means and is independent of the resistive force of the output member;

declutching means operatively disposed between the manually operable means and the clutch shoe for disengaging the clutch shoe from said other of said input and output members when the manually operable means is displaced by manual force; and abutment means mounted on the output element and positioned to be engaged by the manually operable means whereby continued displacement of said manually operable means will move the output member.

2. A control system according to claim 1 wherein said clutch shoe is carried by a support member which is pivotally mounted on said output member and said biasing means acts upon said support member such that said normal force is greater than said biasing force by a predetermined ratio, and said declutching means includes rotatably mounted means for applying a declutching force acting to oppose said biasing force.

3. A control system according to claim 2 wherein said manually operable means includes a manually operable lever system for rotating said rotatably mounted means and for engaging said abutment means after a predetermined rotation of said rotatably mounted means.

4. A control system according to claim 3 wherein said manually operable lever system includes an actuating lever normally disposed in spaced relationship to said abutment means and operably connected to said rotatably mounted means whereby upon application of force to said lever system said actuating lever will move to rotate said rotatably mounted means a predetermined distance before engaging said abutment means to thereby disengage said clutch shoe from said input member and, upon contact with said abutment means, to allow a direct drive of said output member by said manually operable means without frictional drag between clutch components.

5. A control system according to claim 4 wherein said manually operable lever system includes a first lever mounted coaxially with said actuating lever, a second lever rotatably mounted upon said first lever, and an interconnecting means responsive to said second lever for requiring concurrent movement of each of said first, second, and actuating levers when said second lever is in a stowed position and for moving said actuating lever independently of said first lever when manual force is applied to said second lever to move it from its stowed position.